United States Patent

Resnick

[11] Patent Number: 5,978,446
[45] Date of Patent: Nov. 2, 1999

[54] ARC LIMITING DEVICE USING THE SKIN EFFECT IN FERRO-MAGNETIC MATERIALS

[75] Inventor: Theodore A. Resnick, Beachwood, Ohio

[73] Assignee: Picker International, Inc., Highland Heights, Ohio

[21] Appl. No.: 09/017,380

[22] Filed: Feb. 3, 1998

[51] Int. Cl.[6] .................................................. H05G 1/20
[52] U.S. Cl. ........................... 378/105; 378/107; 378/109
[58] Field of Search ..................................... 378/105, 107, 378/109; 323/108, 109; 333/204; 209/7

[56] References Cited

U.S. PATENT DOCUMENTS

| | | | |
|---|---|---|---|
| 4,262,209 | 4/1981 | Berner | 290/7 |
| 4,775,992 | 10/1988 | Resnick et al. . | |
| 4,829,551 | 5/1989 | Resnick et al. . | |
| 5,177,402 | 1/1993 | Howard et al. | 315/1 |
| 5,216,569 | 6/1993 | Brookhiser | 361/107 |
| 5,291,538 | 3/1994 | Burke et al. . | |
| 5,347,571 | 9/1994 | Furbee et al. . | |
| 5,406,235 | 4/1995 | Hayashi | 333/204 |
| 5,602,897 | 2/1997 | Kociecki et al. . | |

*Primary Examiner*—David P. Porta
*Assistant Examiner*—Michael J. Schwartz
*Attorney, Agent, or Firm*—Fay, Sharpe, Fagan, Minnich & McKee, LLP

[57] ABSTRACT

A high voltage power supply includes a high voltage high frequency generator (10) having outputs (12, 14). An arc limiting device (20) is connected in series to the outputs (12, 14) of the generator (10). The arc limiting device (20) includes two coils (22, 24) of a wound length of wire (50) that exhibit a skin effect. The skin effect forces higher frequency current components to flow at a surface of the wire (50) through a limited skin layer portion (62) of a cross section of the wire (50). In one preferred embodiment, the arc limiting device (20) is connected via high voltage cables (32, 34) with an x-ray tube (40). Suitable material for the wire (50) includes those materials with high permeability to resistivity ratios, for example iron, purified iron, 78 permalloy, 4–97 permalloy, mu metal, or supermalloy.

19 Claims, 3 Drawing Sheets

ARC LIMITING DEVICE USING THE SKIN EFFECT IN FERRO-MAGNETIC MATERIALS

BACKGROUND OF THE INVENTION

The present invention relates to the art of high voltage power supplies. The invention finds particular application in conjunction with high voltage power supplies (often referred to as generators in the x-ray art) for x-ray tubes and will be described with particular reference thereto. However, it is to be appreciated that the present invention will also find application in conjunction with arc limiting in other environments.

During an electric arc discharge, such as may occasionally occur in an x-ray tube at high voltage, very high frequency currents from tens of kilo-Hertz to many mega-Hertz are generated. During the arc, the x-ray tube, housing components, or other surrounding elements may be damaged. Therefore, it becomes advantageous to limit or suppress arcing to protect those elements at risk from damage.

In the past, a number of methods have been used for limiting arcing. One such method was to insert an electrical resistance, typically in the form of fixed resistors, in the path of the output voltage. However, depending on the desired output power of the system, this could cause significant voltage loss and power dissipation during normal operation. Moreover, destructive currents were still permitted to flow during an arc.

Another method was to introduce a series inductance in the output with the intent of reducing the rate of rise of the arcing current. Reducing the rise spread the event over time which limited the current peak. While reasonably effective, this method was rather costly. The inductive elements could also require cores, flyback protective diodes, and damping resistance to catch the inductive voltage spikes that resulted from rapidly changing currents. The size and number of coils necessary to achieve the desired inductance tended to be costly. Furthermore, the resultant circuitry took up significant space and could tend to introduce failure modes of its own.

Still another method attempts to match the characteristic impedance of the high voltage transmission cable through a series terminating resistance of relatively low value, typically in the range of 50–100 ohms. This matching then reduces the resonant ringing from the parasitic reactance of the supply cable and load. However, large currents are still permitted to flow, and typically, it is implemented in only the anode end of an x-ray tube as opposed to both the anode and cathode, where the cathode filament connections and current requirements make it impractical.

The present invention contemplates new and improved arc limiting devices which overcome the above-referenced problems and others while significantly reducing the peak arc currents and absorbing much of the arc energy. At the same time, it permits the direct load current to flow to the load with minimal DC resistance, voltage, and power loss.

SUMMARY OF THE INVENTION

In accordance with the present invention, a high voltage power supply includes a high voltage, high frequency generator. An arc limiting device including at least one coil is connected in series to the output of the generator. The coil is a wound length of wire that exhibits a skin effect, forcing higher frequency current components to flow at a surface of the wire through a limited portion of a cross section of the wire.

In accordance with a more limited aspect of the present invention, the ratio of permeability of the wire to resistivity of the wire is greater than or equal to 500 where the permeability is measured in Gauss/Oersted and the resistivity is measured in microhm-cm.

In accordance with a more limited aspect of the present invention, the wire is a ferro-magnetic material.

In accordance with a more limited aspect of the present invention, the wire is made of a material selected from the group consisting of iron, purified iron, 78 permalloy, 4–97 permalloy, mu metal, and supermalloy.

In accordance with another aspect of the present invention, an arc limiting device includes a high voltage, high frequency power supply having a positive and a negative output terminal. An arc limiting device is connected to the power supply. The arc limiting device includes at least two coils of ferro-magnetic wire attached in series with the positive and negative output terminals respectively. During an arc event components of electrical current having higher frequencies are restricted to flow along an outer skin of the ferro-magnetic wire with energy from the electrical current being absorbed thereby.

In accordance with a more limited aspect of the present invention, the ferro-magnetic wire is coated with a magnet wire varnish.

In accordance with a more limited aspect of the present invention, high voltage cables connect the ends of the coils to an anode and cathode of an x-ray tube respectively.

In accordance with another aspect of the present invention, an arc limiter is provided in an x-ray generator including a high voltage power supply connected via the arc limiter to an x-ray tube. The arc limiter includes a wound length of iron wire such that higher frequency components of electrical current flow along an outer skin of the iron wire.

In accordance with a more limited aspect of the present invention, the wound length of iron wire forms a helical coil.

In accordance with a more limited aspect of the present invention, the wound length of iron wire forms flat multiple pancake coils around a ferrite core.

In accordance with a more limited aspect of the present invention, additional lengths of iron wire are wound into coils.

In accordance with a more limited aspect of the present invention, the iron wire coils are arranged in one of a parallel manner, a series manner, and a combination of parallel and series manners.

In accordance with another aspect of the present invention, a method of suppressing arc in the generation of x-rays includes generating an electrical current. The electrical current is directed through a coil of resistive metal and the higher frequency components of the electrical current are forced to flow at a surface of the resistive metal through a limited skin layer of the resistive metal. Thereafter, the electrical current is applied to an x-ray tube.

In accordance with a more limited aspect of the present invention, the method further includes absorbing energy from the high frequency components of the electrical current.

In accordance with a more limited aspect of the present invention, the method further includes converting and storing excess electrical energy in a magnetic field.

In accordance with another aspect of the present invention, a line filter for reducing noise in an electrical power transmission line includes at least one coil attached along the electrical power transmission line. The coil includes a wound length of ferro-magnetic wire that exhibits a skin effect, such that higher frequency components of electrical current flowing therethrough are forced to flow along a surface of the wire through a limited portion of a cross section of the wire.

In accordance with a more limited aspect of the present invention, the wire is constructed of a metal with a ratio of permeability to resistivity higher or equal to 500 where the permeability is measured in Gauss/Oersted and the resistivity is measured in microhm-cm.

In accordance with a more limited aspect of the present invention, the line filter includes multiple coils attached in one of a parallel manner, a series manner, and a combination of parallel and series manners.

One advantage of the present invention is that it limits arcing.

Another advantage of the present invention resides in a reduction of internal damage to x-ray tubes and other components at risk from damage attributable to arcing.

Another advantage resides in prolonged x-ray tube life and stability.

Another advantage of the present invention is that in normal operation, voltage and power loss is reduced while maintaining protection from high frequency, high energy current pulses that result from an arc event.

Still another advantage of the present invention is that flyback diodes and/or damping resistors may be unnecessary under certain conditions.

Another advantage of the present invention is that it significantly reduces the peak arc currents and absorbs much of the arc energy while permitting the direct load current to flow to the load with minimal DC resistance voltage and/or power loss.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
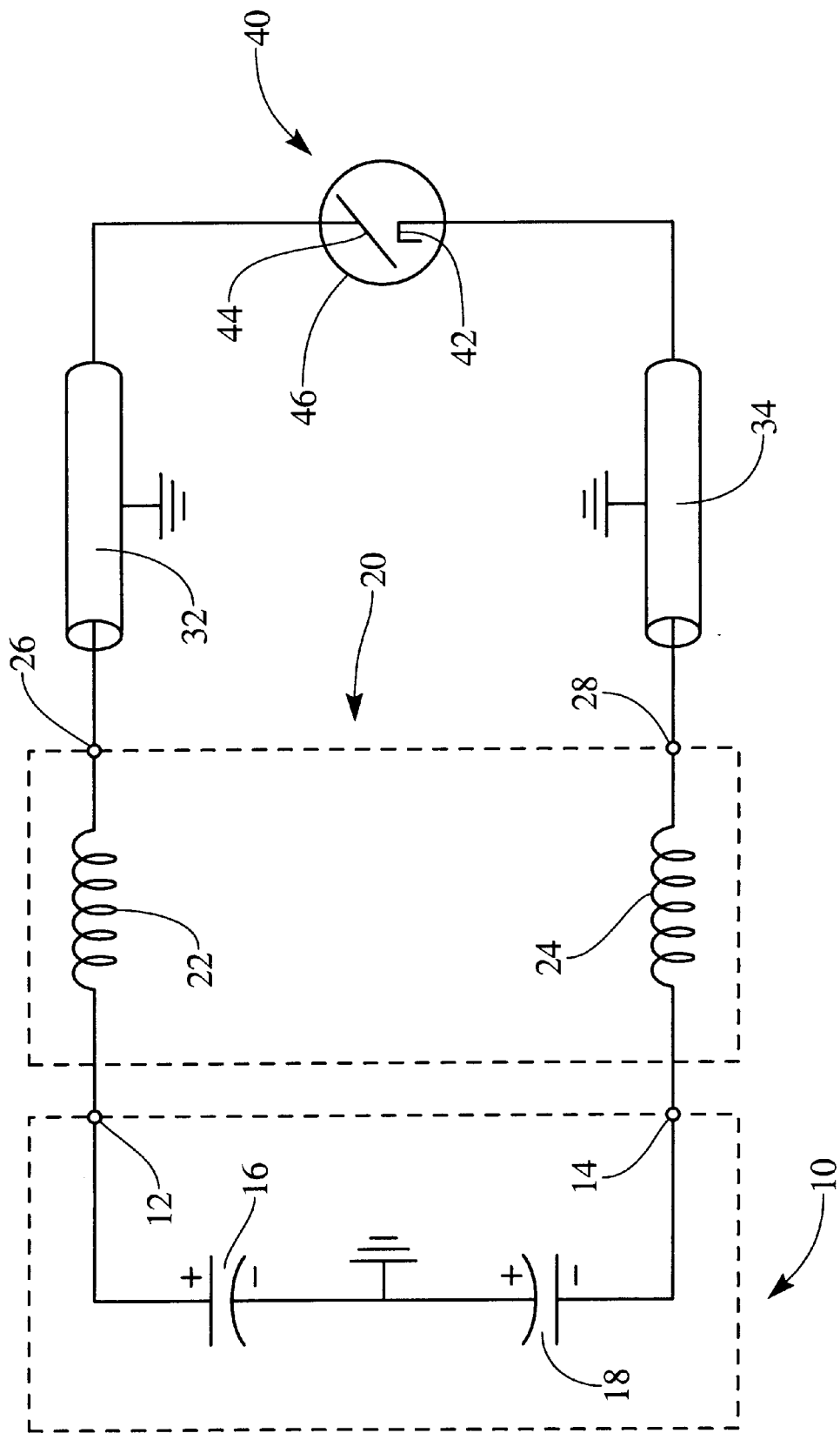
FIG. 1 is a circuit diagram of a voltage generator equivalent circuit, x-ray tube, an arc limiting device in accordance with the present invention.

With reference to FIG. 1, a high frequency multiplier-type generator 10 produces a high voltage output, positive at a first or anode output 12 and negative at a second or cathode output 14. The high frequency voltage generator 10, which is of conventional construction, has an equivalent circuit of a capacitor. More specifically, the generator has an effective capacitance 16 between ground and the first or anode output 12 and a capacitance 18 between ground and a second or cathode output 14.

In the illustrated embodiment, an arc limiting device 20, including a first coil 22 and a second coil 24, is connected to the generator 10. The coils 22 and 24 are connected to the first or anode output 12 and the second or cathode output 14, respectively. However, in different embodiments and/or applications, the arc limiting device 20 may be incorporated within the high frequency voltage generator 10 such that outputs 26 and 28 of the arc limiting device 20 are outputs of an arc suppressing high voltage generator.

The outputs 26 and 28 are connected via high voltage cables 32 and 34 with an x-ray tube 40. The x-ray tube 40 includes an electron source 42 such as a filament which is heated by a filament heating current from a filament current source (not shown). The heated filament generates a cloud of electrons which are drawn to a target electrode or anode 44 by the potential applied by the high voltage generator 10 across the electron source 42 and the target 44 to form an electron beam. When the electron beam impacts the target 44, a beam of x-rays is generated. The anode or target 44 and electron source 42 are sealed in a vacuum envelope 46.

Figure 2B:
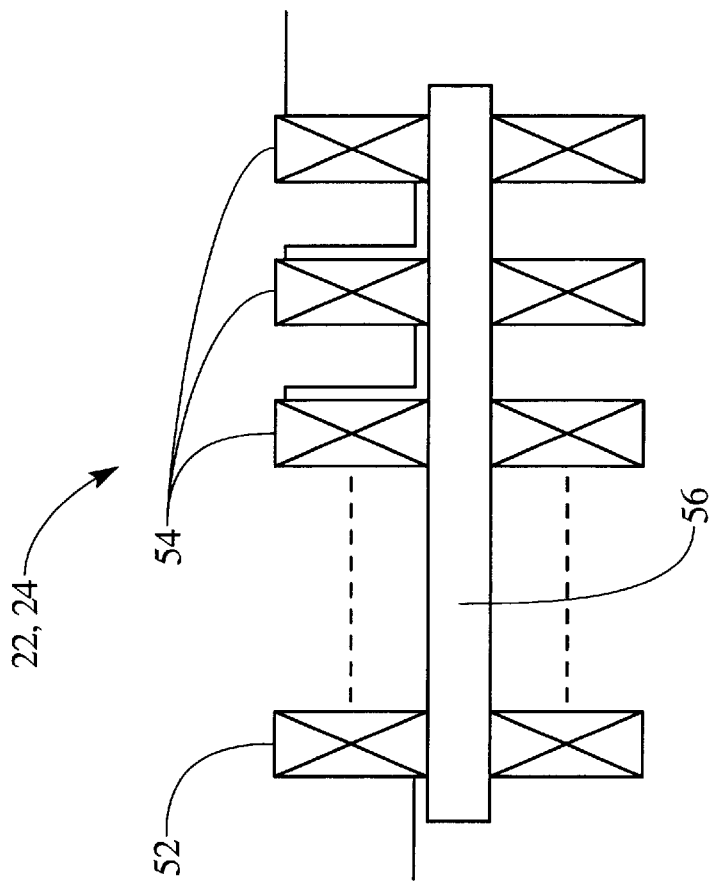
FIGS. 2A, 2B, and 2C are diagrammatic illustrations of the coils of the arc limiting device in accordance with the present invention; and, FIG. 3 is a diagrammatic illustration of the skin effect employed in accordance with the present invention.
Figure 2A:
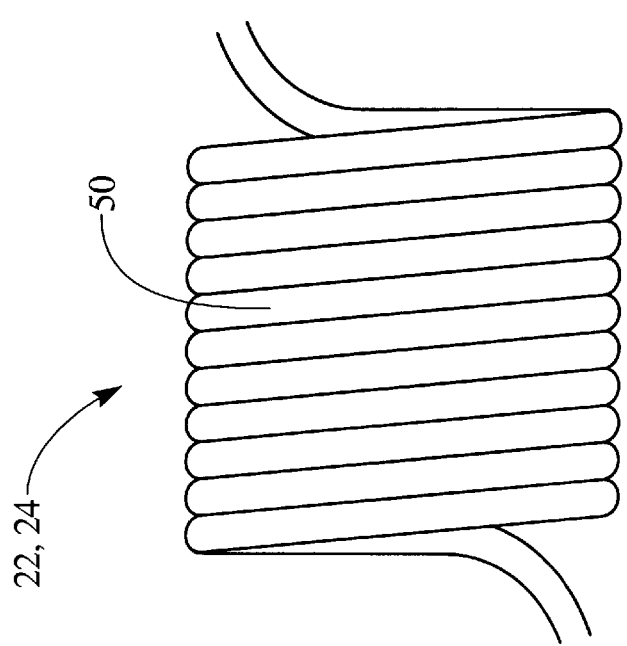

With reference to FIGS. 2A and 2B, the coils 22, 24 are resistive/inductive elements wound from a length of small diameter ferro-magnetic wire 50 having a relatively high ratio of permeability to resistivity, preferably greater than or equal to 500 where the maximum permeability is measured in Gauss/Oersted and resistivity is measured in microhm-cm. In preferred embodiments, suitable material includes iron, purified iron, 78 permalloy, 4–97 permalloy, mu metal, or supermalloy. The coils are wound to minimize or enhance the inductance of a geometric form used for the winding, such as a coil (as shown in FIG. 2A) or a flat multiple pancake coil assembly (as shown in FIG. 2B). The flat multiple pancake coil assembly permits the required large inductance to be obtained in a small space. The first coil 52 of the flat multiple pancake coil assembly is wound from the inner diameter towards the outer diameter. The winding continues to a second coil also wound from the inner to outer diameter. Similarly, additional coils 54 are mounted in axial alignment as shown each wound from the inside to the out and spaced apart from the preceding coil. The coils are housed in a tank which is filled with a dielectric oil. Alternately, the coils are potted in a suited dielectric resin material shielded with a grounded conductive outer sheath. Further, a ferrite core 56 may extend through the inner diameter of the coils.

Figure 2C:
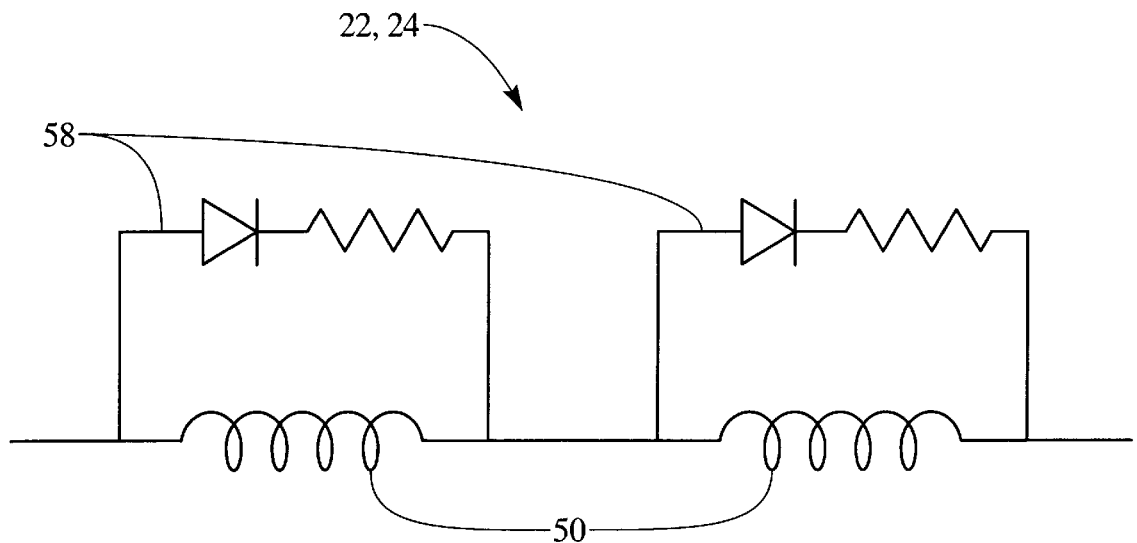

With reference to FIG. 2C, in one preferred embodiment, each coil 22, 24 may include multiple winds of wire 50. The multiple winds of wire 50 may be connected in series (as illustrated), parallel, or a combination of both depending on the design requirements of the system. Additionally, for some applications, it is desirable to include resistor diode pairs 58 in parallel with each winding of wire 50.

Figure 3:
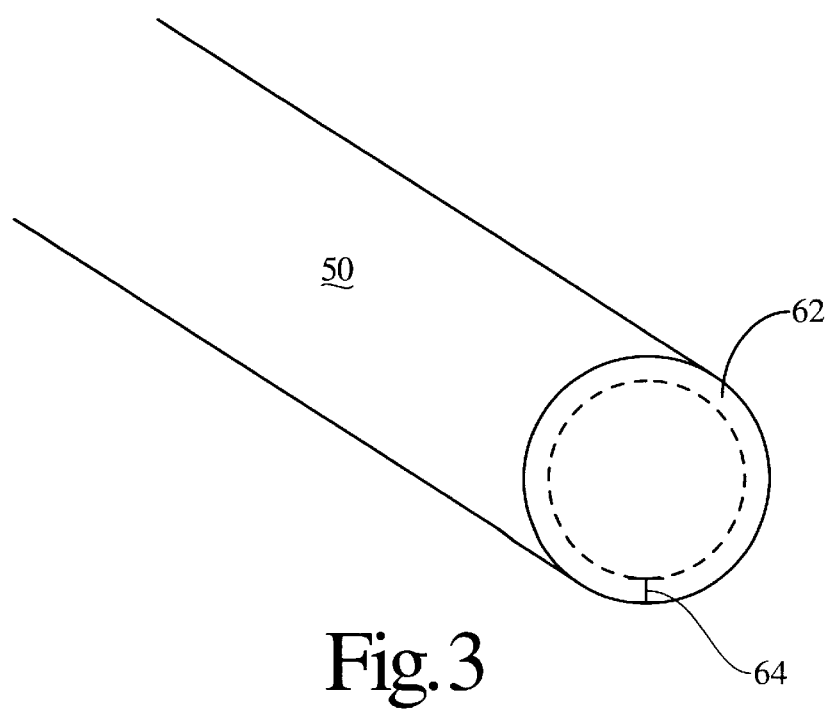

With reference to FIG. 3, in operation, the arc limiting device 20 uses the skin effect to absorb high frequency components of arcing currents. The skin effect is the tendency for high frequency currents to flow on the surface of a conductor, rather than through the entire cross section as DC currents do. Forcing the current to flow through a limited skin portion 62 of the conductor in this manner reduces the conducting cross section thereby increasing the resistance to high frequency current flow. The high resistance of the wire at high frequencies causes energy in the high frequency current pulse generated by the arcing event to be absorbed thereby reducing the energy transferred to the load, in this case, an x-ray tube 40 and reducing the potential for damage thereto.

Skin depth 64 is inversely related to the square root of permeability and directly related to the square root of resistivity. The shallower the skin depth 64 the more limited the cross section through which the high frequency current flows and, accordingly, the higher the resistance. Therefore, suitable material for the coils 22, 24 are those in which the ratio of permeability to resistivity is relatively high, such as ferro-magnetic material specifically iron, purified iron, 78 permalloy, 4–97 permalloy, mu metal, or supermalloy. That is to say, for any given frequency, the higher ratio forces a smaller skin depth as compared to non-ferro magnetic wires such as copper. This further limits the cross sectional area actually conducting the current, thereby providing a higher resistance path than copper at that frequency. Further, due to the high self-inductive nature of iron, for example, the wire in the iron coil acts like an inductor when put into a circuit to convert and store excess energy, and its resistance acts to severely dampen possible resonant oscillations. As the frequency increases, the skin depth decreases forcing more energy into less conductor. When the energy per unit volume of conductor gets high enough, the iron saturates and functions as a resistance.

Optionally, the coil can be wound from ferrous tubing. Because the surface to volume ratio is greater on smaller diameter wire, the coil preferably includes a plurality of high gauge (small diameter) ferrous coils connected in parallel. Additionally, single or parallel coil assemblies may be connected in series. The diameter is preferably matched (for the permeability of the metal) to the minimum target frequency of the current to be dampened. Non-circular wires are also contemplated.

While the invention has been described with reference to arc limiting in high voltage power supplies for x-ray tubes, it is appreciated that the described invention finds application in other environments. For example, the described invention finds particular applicability in noise filtering/limiting, wherein during power transfer from one component to another, line carried high frequency noise currents are to be eliminated. The skin effect combined with the inductive and resistive nature of the coils would absorb the noise.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A high voltage power supply comprising:
    a high voltage high frequency generator including an output; and,
    an arc limiting device connected in series to the output of the generator, said arc limiting device having at least one coil which includes;
        a wound length of ferro-magnetic wire that exhibits a skin effect, forcing higher frequency current components to flow at a surface of the wire through a limited portion of a cross section of the wire.

2. The high voltage power supply of claim 1, wherein the wire is constructed of a metal with a ratio of permeability to resistivity higher or equal to 500 where the permeability is measured in Gauss/Oersted and the resistivity is measured in microhm-cm.

3. The high voltage power supply of claim 1, wherein the wire is a material selected from the group consisting of iron, purified iron, 78 permalloy, 4–97 permalloy, mu metal, and supermalloy.

4. An arc limiting device for a high voltage, high frequency power supply including a positive output terminal and a negative output terminal, the arc limiting device including:
    at least two coils of ferro-magnetic wire attached in series with the positive and negative output terminals respectively such that during an arc event components of electrical current having higher frequencies are restricted to flow along an outer skin of the ferro-magnetic wire with energy from the electrical current being absorbed thereby.

5. The arc limiting device of claim 4, wherein the ferro-magnetic wire is coated with a magnet wire varnish.

6. The arc limiting device of claim 5, wherein the wire is constructed of a material with a ratio of permeability to resistivity higher or equal to 500 where the permeability is measured in Gauss/Oersted and the resistivity is measured in microhm-cm.

7. The arc limiting device of claim 4, wherein ends of the coils are connected to an anode and a cathode of an x-ray tube, respectively, by high voltage cables.

8. In an x-ray generator including a high voltage power supply connected via an arc limiter and high voltage cables to an x-ray tube, the arc limiter comprising:
    a wound length of iron wire, such that higher frequency components of electrical current flow along an outer skin of the iron wire.

9. The arc limiter of claim 8, wherein the wound length of iron wire forms a helical coil.

10. The arc limiter of claim 8, wherein the wound length of iron wire forms multiple pancake coils around a ferrite core.

11. The arc limiter of claim 8 further including additional lengths of iron wire wound into coils.

12. The arc limiter of claim 11 wherein the iron wire coils are arranged in one of a parallel manner, a series manner, and a combination of parallel and series manners.

13. A method of suppressing arcs in the generation of x-rays comprising:
    (a) generating an electrical current;
    (b) directing the electrical current through a coil of ferro-magnetic metal;
    (c) forcing higher frequency components of the electrical current to flow at a surface of the ferro-magnetic metal through a limited skin layer of the ferro-magnetic metal; and,
    (d) applying the electrical current to an x-ray tube.

14. A method of suppressing arcs in the generation of x-rays comprising:
    (a) generating an electrical current which has desirable lower frequency components and undesirable higher frequency components;
    (b) directing the electrical current to a coil of ferrous wire;
    (c) preferentially attenuating the higher frequency current components more strongly than the lower frequency current components by forcing the higher frequency components of the electrical current to flow through a limited skin layer of the ferrous wire saturating the skin layer causing the skin layer to become more resistive while passing the lower frequency components below the skin layer of the ferrous wire without saturation; and,
    (d) applying the electrical current with attenuated higher frequency components to an x-ray tube.

15. The method of claim 13, wherein in step (c) the method further includes:

absorbing energy from the higher frequency components of the electrical current in the skin layer.

16. The method of claim 13, wherein in steps (b) and (c) the method further includes:

converting and storing excess electrical energy in a magnetic field.

17. A line filter for reducing noise in an electrical power transmission line comprising:

at least one coil attached along the electrical power transmission line, the coil including a wound length of ferro-magnetic wire that exhibits a skin effect, such that higher frequency components of electrical current flowing therethrough are forced to flow along a surface of the wire through a limited portion of a cross section of the wire.

18. The line filter of claim 17, wherein the wire is constructed of a metal with a ratio of permeability to resistivity higher or equal to 500 where the permeability is measured in Gauss/Oersted and the resistivity is measured in microhm-cm.

19. The line filter of claim 17, wherein the line filter includes multiple coils attached in one of a parallel manner, a series manner, and a combination of parallel and series manners.

* * * * *